INVENTOR.
R. M. NETI

ATTORNEY

United States Patent Office 3,579,305
Patented May 18, 1971

3,579,305
SCRUBBER APPARATUS
Radhakrishna M. Neti, Brea, Calif., assignor to Beckman Instruments, Inc.
Filed July 25, 1968, Ser. No. 747,721
Int. Cl. C09k *3/00;* G01n *31/06*
U.S. Cl. 23—232                3 Claims

ABSTRACT OF THE DISCLOSURE

A solid phase chemical scrubber for selectively removing interferrents from an ozone bearing sample gas stream which is to be analyzed for its ozone content. The scrubber contains an alkali or alkaline earth hydroxide, preferably $Ca(OH)_2$ or KOH, which effectively removes both positive and negative interferrents from the gas stream, but does not affect the ozone in the stream.

BACKGROUND OF THE INVENTION

Field of the invention

This invention relates to a scrubber apparatus for removing constituents in a gas sample stream and more particularly to a scrubber apparatus for selectively removing interferrent constituents from a sample gas stream also containing ozone which would interfere with an analysis of the ozone.

DESCRIPTION OF OPERATIONAL ENVIRONMENT

Gas analyzers such as that disclosed in Pat. No. 3,314,864 to Paul A. Hersch and assigned to the assignee of the present application, function by having a chemical reaction occur between the constituent gas to be detected and a halide and then having one of the products of the reaction reduced galvanically to produce an electrical signal indicative of the quantity of reacting constituents as deteremined by Faraday's law. For example, if ozone is the gas to be analyzed and the electrolyte used in the analyzer is potassium iodide, the chemical reaction may be written $2KI + O_3 + H_2O \rightarrow I_2 + 2KOH + O_2$. The liberated $I_2$ is reduced galvanically at an inert cathode such as a platinum screen and the resulting current developed between the platinum cathode and an active carbon anode is precisely measured.

Since it is the reduction of $I_2$ which establishes the measuring signal any oxidation of the potassium iodide which is not caused by the $O_3$ would give rise to a signal in excess of that indicating the $O_3$ quantity. Any material that oxidizes the potassium iodide is a positive interferrent. Similarly the presence of interferrents which may chemically react with $I_2$ and cause reduction thereof would also give rise to a misleading signal and are termed negative interferrents. Examples of positive interferrents which may be found in gas mixtures also containing ozone are nitrogen dioxide ($NO_2$), chlorine ($Cl_2$), bromine ($Br_2$) and halogen acids (such as HCl). Examples of negative interferrents are sulfur dioxide ($SO_2$), hydrogen sulfide ($H_2S$), mercaptan (RSH where R stands for an alkyl or alkene radical) and ammonia ($NH_3$).

To have proper operation of an ozone analyzer as described above, it is necessary that a scrubber apparatus be employed to remove most or all of the interferrents or reduce the interferrents to a level so as to not appreciably disturb accurate ozone measurements. As disclosed in a copending application Ser. No. 649,675 filed June 28, 1967, now U.S. Pat. No. 3,495,944, issued Feb. 17, 1970, assigned to the asignee of the present application, it is desirable that the scrubber be of a solid phase material.

OBJECTS

It is an object of the present invention to provide a scrubber apparatus which will remove interferrents from a gas sample stream.

Another object of the present invention is to provide a scrubber apparatus which will selectively remove interferrents from an ozone-bearing gas stream so that the ozone may be accurately detected by an ozone analyzer.

Still another object of the present invention is to provide a scrubber apparatus which is a solid-phase chemical scrubber, easily handled, and requires a minimum of maintenance.

Other objects, aspects and advantages will become apparent from the following description taken in connection with the drawing.

DESCRIPTION OF THE PREFERRED EMBODIMENTS

Figure 1:
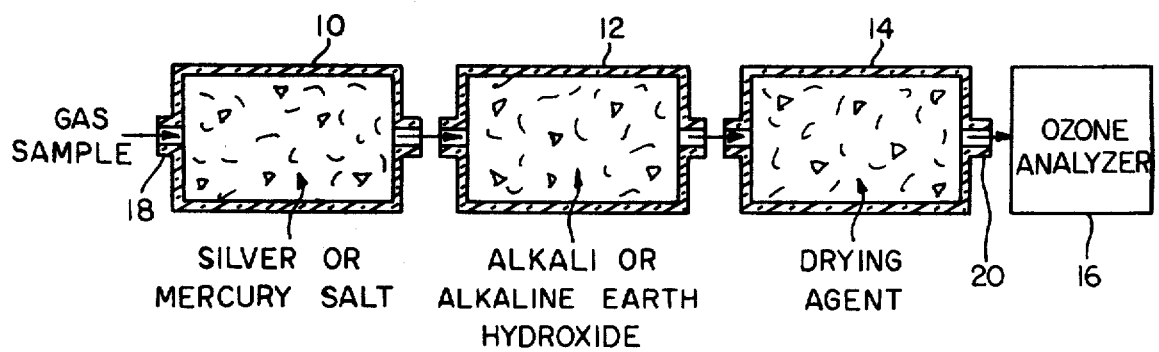
FIG. 1 is a schematic section view illustrating the inventive scrubber apparatus employed with an ozone analyzer.

Referring now to FIG. 1 there is shown a scrubber apparatus comprising three containers or compartments 10, 12 and 14 aligned in series with a gas analyzer 16 which may be the ozone analyzer referred to above. A gas sample may enter through inlet port 18, pass through the scrubbing material in each of the three containers with the effluent from the scrubbers passing through outlet port 20 before entering the gas analyzer 16. The containers 10, 12 and 14 may be cylindrical glass tubes having a 1 cm. diameter and being about 5 cm. in length.

Figure 2:
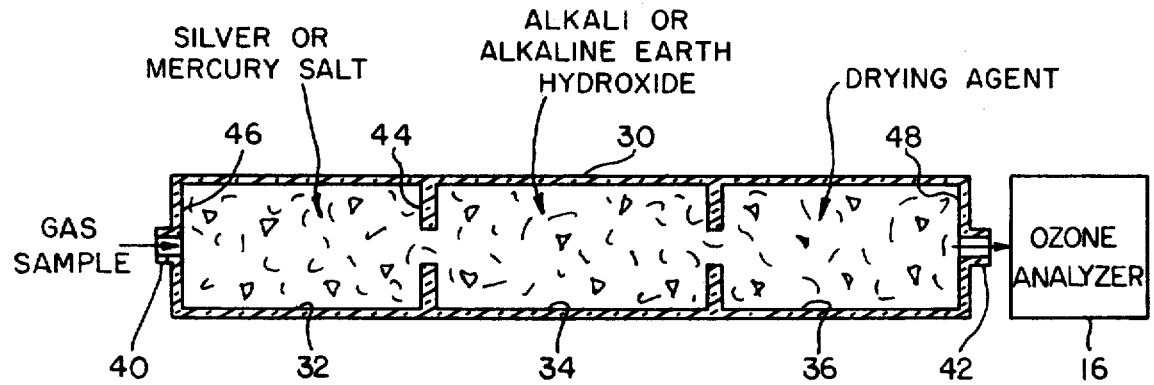
FIG. 2 is a schematic view of another preferred embodiment of the inventive scrubber apparatus employed with an ozone analyzer.

Referring now to FIG. 2 there is illustrated another embodiment of the scrubber apparatus within one container 30 which is partitioned into three compartments 32, 34 and 36. A gas sample is passed into inlet port 40 through the scrubber material in the three compartments and exits through outlet port 42 to the gas analyzer 15. The container 30 may be an elongated cylindrical glass or Teflon i.e., tetrafluoroethylene tube approximately 1 cm. in diameter and about 15 cm. long. A scrubber material found to react with and remove the positive and negative interferrents mentioned above is a compound of an alkali hydroxide or alkaline earth hydroxide, but unexpectedly it has been found that such a compound does not appreciably affect ozone. More particularly, potassium hydroxide (KOH) and calcium hydroxide ($Ca(OH)_2$) have been found to work very well, with $Ca(OH_2)$ being the most preferred because of its quickness of response and completely negligible effect on the ozone constituent in the sample gas stream. Other suitable compounds for practicing my invention are barium hydroxide, sodium hydroxide and magnesium hydroxide.

The advantage of the present invention can be better appreciated by considering the following specific examples of tests run with the above mentioned scrubber material.

Example 1

A permeation tube was provided as a source of $NO_2$ which was admitted into an ozone analyzer of the type described in the aforementioned Hersch patent. A deflection of 56.5 was recorded on a 1 p.p.m. full scale or a reading of .565 p.p.m. The flow of $NO_2$ was continued for about twenty-three minutes before being stopped. A scrubber tube containing two to three grams of $Ca(OH)_2$ was inserted between the permeation tube containing the $NO_2$ and the ozone analyzer. The flow of $NO_2$ was again initiated. The $NO_2$ response began to decrease. The decrease continued to a reading of 5 on the 1 p.p.m. scale or an indication of .050 p.p.m. when the test was stopped. Hence, the scrubber showed an efficiency of about 90% for removing $NO_2$. The chemical reaction taking place between the $Ca(OH)_2$ and $NO_2$ was as follows:

$$Ca(OH)_2 + NO_2 \rightarrow CaNO_3 + H_2O$$

Example 2

The interferrent $Cl_2$ was generated by electrolysis of an aqueous solution of sodium chloride in an H-shaped cell. The electrolysis was maintained at a current of 200 microamps. The liberated $Cl_2$ was admitted into the ozone analyzer and the chart recorded a reading of 92 on the 2 p.p.m. scale or a reading of 1.84 p.p.m. $Cl_2$. After a continuation of the test for about thirty minutes, a $Ca(OH)_2$ scrubber tube was inserted between the $Cl_2$ electrolysis cell and the ozone analyzer. Immediately after the introduction of the scrubber tube, the chart indication dropped to nearly zero even after a scale increase to .25 p.pm. full scale. The efficiency of the calcium hydroxide in removal of chlorine was indicated to be about 99% and the chemical reaction taking place was:

$$2Ca(OH)_2 + Cl_2 \rightarrow 2CaOCl + H_2O$$

Bromine would react in an analogous fashion with a chemical reaction as follows:

$$2Ca(OH)_2 + Br_2 \rightarrow 2CaOBr + 2H_2O$$

Example 3

A gas mixture consisting of about 0.5 p.p.m. $SO_2$ and the balance of dry nitrogen was prepared. The exact $SO_2$ concentration of this mixture was determined with a Beckman Model 906 $SO_2$ Analyzer, which is a modified Hersch ozone analyzer. More specifically, the $SO_2$ analyzer includes a third electrode whereat a constant halogen level is electrolytically generated. The $SO_2$ entering the analyzer reduces the halogen level, thus altering the current output of the analyzer as a function of the rate of $SO_2$ delivered thereto. The $SO_2$ analyzer indicated a sample registering 55 on an 0.5 p.p.m. full scale range or a concentration of .275 p.p.m. $SO_2$. The test was run for approximately twenty-five minutes at which time the sample was shut off with the Model 906 $SO_2$ Analyzer allowed to return to a zero base line. After about twenty minutes, a scrubber tube containing two to three grams of $Ca(OH)_2$ was inserted before the analyzer and the $SO_2$ was allowed to flow through this tube to the analyzer. The Model 906 $SO_2$ Analyzer indicated an increase of about four divisions on the same 0.5 p.p.m. range scale mentioned earlier or an indication of .020 p.p.m. $SO_2$. Thus, a scrubber efficiency of about 92% for removing $SO_2$ was indicated and the reaction was as follows:

$$Ca(OH)_2 + SO_2 \rightarrow CaSO_3 + H_2O$$

Example 4

A sample of approximately 5 p.p.m. of $H_2S$ was prepared with the balance of dry nitrogen. The exact concentration was again determined by a Beckman Model 906 $SO_2$ Analyzer without the use of the selective scrubber. The sample was diluted by mixing 110 milliliters of the $H_2S$ sample with 60 milliliters of filtered laboratory air. After about eleven minutes a reading of 84 on a 4 p.p.m. full scale was indicated. The $H_2S$ sample was shut off and the instrument placed at the zero base line. The $Ca(OH)_2$ scrubber tube was then inserted between the $H_2S$ container and the Model 906 $SO_2$ Analyzer. Upon the initiation once again of the $H_2S$ flow, there was no noticeable movement of the meter from the zero level for about a period of twenty minutes at which time the test was discontinued. Therefore, the calcium hydroxide scrubber had an efficiency of over 99% for removing $H_2S$ and a reaction as follows:

$$Ca(OH)_2 + H_2S \rightarrow CaS + 2H_2O$$

Example 5

A sample of methyl mercaptan was prepared with the balance of dry nitrogen. The exact concentration was determined on the Model 906 $SO_2$ Analyzer with the scrubber tube removed. On a 4 p.p.m. scale a deflection of 63 was indicated after a period of nine minutes which indicated a presence of 2.52 p.p.m. of mercaptan. The methyl mercaptan sample was then shut off and the instrument allowed to return to the zero base line. A scrubber containing two to three grams of $Ca(OH)_2$ was then placed in the analyzer system and the sample flow again started. There was no indication of any methyl mercaptan being measured by the $SO_2$ Analyzer for a period of about thirty minutes, during which the mercaptan was allowed to flow. Thus, the scrubber had an efficiency of over 99% for removing the mercaptan. The reaction between a mercaptan and $Ca(OH)_2$ is as follows:

$$Ca(OH)_2 + 2RSH \rightarrow Ca(SH)_2 + 2RHO$$

where R is an alkyl or alkene radical.

Similarly the reaction of $Ca(OH)_2$ and halide acids would be as follows:

$$Ca(OH)_2 + 2HCl \rightarrow CaCl_2 + 2H_2O$$

$$Ca(OH)_2 + 2HBr \rightarrow CaBr_2 + 2H_2O$$

Example 6

The test of Example 3 was rerun with KOH as the scrubber material. A reading of .08 p.p.m. $SO_2$ was indicated. Thus, scrubber efficiency was about 71%. The reaction was as follows:

$$2KOH + SO_2 \rightarrow K_2SO_3 + H_2O$$

Example 7

The test of Example 4 was rerun with KOH as the scrubber material. There was no noticeable movement of the indicating instrument, thus indicating over 99% scrubber efficiency. The chemical reaction was as follows:

$$2KOH + H_2S \rightarrow K_2S + 2H_2O$$

Example 8

To show the lack of effect of the scrubber of the present invention on ozone, an ozone-containing gas stream was analyzed for its ozone content by the previously mentioned ozone analyzer before and after the scrubber was inserted in the gas train. The ozone was generated by an ultraviolet lamp in a manner well known in the art. The ozone-containing gas stream was passed through the analyzer without the scrubber at a flow rate of about 143 ml./min. for about thirty minutes. A deflection of 60.0 was recorded on a 4 p.p.m. full scale. The scrubber tube containing two to three grams of $Ca(OH)_2$ was then inserted in the gas train before the ozone analyzer. The flow of the gas stream was again initiated and continued for about 80 minutes. The flow rate of the stream decreased to about 137 ml./min. due to the slight resistance to flow caused by the scrubber. A deflection of 58.0 was recorded. This deflection is almost identical to that produced by the analyzer without the scrubber when the effect of the decrease in flow rate of the gas stream is considered. Thus, the scrubber does not react with or otherwise remove ozone.

From the foregoing examples, it is clearly seen that my scrubber is capable of selectively removing both positive and negative interferrents from an ozone-containing gas stream.

It is noted that hydrocarbons, aldehydes and ketones do not interfere with the operation of the Hersch ozone analyzer.

The addition of a silver or mercury salt to supplement the Ca(OH)$_2$ or KOH is preferable. Suitable silver or mercury salts are silver nitrate (AgNO$_3$), and mercury chloride (HgCl$_2$). Examples of reactions with the above materials are as follows:

$$AgNO_3 + HCl \rightarrow AgCl + HNO_3$$

$$HgCl_2 + H_2S \rightarrow HgS + 2HCl$$

$$HgCl_2 + 2RSH \rightarrow Hg(SH)_2 + 2RCl$$

The addition of a halide drying agent is also preferable to remove water from the sample and to supplement removal of ammonia. A preferable halide is CaCl$_2$. (Reaction: CaCl$_2$+NH$_3$→CaCl$_2$·(NH$_3$)$_x$.) Additional suitable drying agents are anhydrous CaSO$_4$ and P$_2$O$_5$.

The silver or mercury salt may be placed in container 10, FIG. 1 (or in the first compartment 32 of container 30, FIG. 2). If AgNO$_3$ is used, it will appear in a crystal form. HgCl$_2$ may be dissolved and then coated on a support material as disclosed in the above mentioned copending application. A suitable supporting material having the desired characteristics of being nonchemically reactive and nonabsorbing to the gaseous constituents in the gas sample stream is powdered polyhalogenated hydrocarbon polymers such as DuPont Teflon i.e. tetrafluoroethylene. The powdered Teflon resin is coated by dissolving 6% of mercuric chloride by weight relative to the support material weight in a solvent such as alcohol and mixing the solution with the Teflon powder. The Teflon powder-solvent mixture is heated in an oven or left in the open at room temperature for an extended period of time to evaporate the solvent, leaving only dry granules of Teflon covered with mercuric chloride. Some of the alkali or alkaline hydroxides, such as KOH, and the halides may also be coated on Teflon powder. When Ca(OH)$_2$ is being used with the silver or mercury salt and halide or by itself, it may simply be homogeneously mixed with the Teflon powder and dried at 60-70° C. leaving the granules of Ca(OH)$_2$ separated sufficiently to present a large surface area to the passing gas stream and to allow an easy passage of the gas stream therethrough.

A support material such as partition 44, FIG. 2, as well as screens 46 and 48 may be porous Teflon cloth which is very porous. The cloth acts as a filter for particulate matter but does not retain any ozone. Such a cloth may be acquired from the Pallflex Products Corporation, a subsidiary of the Pall Corporation of Putnam, Conn., and is sold under the trademark "EMFAB" number TV 20A-40.

It has been found that the scrubber compositions described above remove the interferrents to levels of less than a few parts per billion. The life of the scrubber is more than 200 parts per million hours. Hence O$_3$ of 10 parts per billion can be detected without the interference of normal contaminants in an ozone-bearing gas stream.

Although the invention has been described in considerable detail with particular reference to certain preferred embodiments thereof, variations and modifications can be effected within the spirit and scope of the invention as described hereinabove, and as defined in the appended claims.

I claim:
1. A method of preparing a gas stream containing ozone and interferrents for analysis with an analyzer that is responsive to both the ozone and the interferrents comprising passing the gas stream through an interferrent scrubber without affecting the ozone in the stream and conveying the gas effluent from said scrubber to said analyzer wherein the scrubber contains materials including a scrubber material selected from the group consisting of alkali and alkaline earth hydroxides and wherein the scrubber contains in individual compartments additional scrubber materials including a scrubber material selected from a second group consisting of mercuric chloride and silver nitrate; and a scrubber material selected from a third group consisting of calcium chloride, phosphorous pentoxide and anhydrous calcium sulfate.

2. A scrubber apparatus for selectively removing interferrents from a gas stream containing ozone without affecting the ozone in the stream, said apparatus having an inlet port and an outlet port adapted to be connected to an ozone analyzer which is responsive to the interferrents as well as ozone and including within said apparatus in the flow path of the gas stream in individual compartments;

a scrubber material selected from a first group consisting mercuric chloride and silver nitrate;

a scrubber material selected from a second group consisting of alkali and alkaline earth hydroxides; and a scrubber material selected from a third group consisting of calcium chloride, phosphorous pentoxide and anhydrous calcium sulfate.

3. A scrubber apparatus as claimed in claim 2 wherein said second group consists of potassium hydroxide and calcium hydroxide.

References Cited

UNITED STATES PATENTS

| 2,813,010 | 11/1957 | Hutchins | 23—254X |
| 3,112,998 | 12/1963 | Grosskopf | 23—232X |
| 3,399,038 | 8/1968 | Maurice et al. | 23—254 |
| 3,495,944 | 2/1970 | McGee et al. | 23—232 |

OTHER REFERENCES

Fisher 63 Modern Laboratory Appliances, pp. 314, 395 relied on.

MORRIS O. WOLK, Primary Examiner

R. M. REESE, Assistant Examiner

U.S. Cl. X.R.

23—254, 2; 252—408